United States Patent
McClure et al.

(10) Patent No.: US 7,184,537 B2
(45) Date of Patent: Feb. 27, 2007

(54) APPARATUS AND METHOD FOR CNG DETECTION WITH CALL WAITING

(75) Inventors: William C. McClure, Englewood, CO (US); Gary S. Smock, Arvada, CO (US); Charles E. Copeland, Vista, CA (US)

(73) Assignee: Command Communications, Inc., Englewood, CO (US)

( * ) Notice: Subject to any disclaimer, the term of this patent is extended or adjusted under 35 U.S.C. 154(b) by 72 days.

(21) Appl. No.: 10/860,211

(22) Filed: Jun. 3, 2004

(65) Prior Publication Data

US 2005/0271197 A1 Dec. 8, 2005

(51) Int. Cl.
*H04M 3/42* (2006.01)
(52) U.S. Cl. .............................. 379/215.01; 379/88.13
(58) Field of Classification Search .......... 379/215.01, 379/88.13, 265.09, 900, 93.35
See application file for complete search history.

(56) References Cited

U.S. PATENT DOCUMENTS

| | | | |
|---|---|---|---|
| 5,146,489 A | | 9/1992 | Telibasa |
| 5,151,972 A | | 9/1992 | Lorenz et al. |
| 5,490,210 A | | 2/1996 | Sasso |
| 5,530,558 A | | 6/1996 | Nachman |
| 5,546,451 A | * | 8/1996 | Shen ...................... 379/215.01 |
| 6,067,353 A | * | 5/2000 | Szeliga ..................... 379/93.35 |
| 6,628,771 B1 | * | 9/2003 | Frise et al. ............. 379/215.01 |
| 2004/0120495 A1 | * | 6/2004 | Rice et al. ............. 379/215.01 |
| 2004/0151286 A1 | * | 8/2004 | Nassimi ................... 379/88.17 |
| 2005/0195953 A1 | * | 9/2005 | Rice et al. ............. 379/201.03 |

* cited by examiner

*Primary Examiner*—Creighton Smith
(74) *Attorney, Agent, or Firm*—Dorr, Carson & Birney, P.C.

(57) ABSTRACT

A telephone switching device which includes a detector for identifying a call waiting (CW) signal when the incoming telephone line is in use. The detector device automatically switches the incoming telephone line to the second call and monitors for additional coded function signals such as a facsimile machine calling (CNG) signal indicating that a data transmission is desired. Appropriate switching functions are provided to connect attached telephony data devices for receiving the incoming data transmission. A microprocessor is used for receiving various function signals and performing the switching of the telephone line and attached apparatus. This allows the reception of an incoming data transmission on a single telephone line while the line is already in use. A voice message can be provided before the switching of the telephone line in response to the CW signal warning the first caller of the impending switch. Provisions are included for verifying incoming function signals and time delay sequences are incorporated for the attached data apparatus to be initiated and receive the incoming data transmission.

12 Claims, 4 Drawing Sheets

APPARATUS AND METHOD FOR CNG DETECTION WITH CALL WAITING

BACKGROUND OF THE INVENTION

1. Field of the Invention

This invention includes the apparatus and method for detecting facsimile transmission (CNG) signals on a telephone line while answering a call waiting (CW) signal. It is more specifically directed to a CNG detection and switching apparatus for use during a call waiting sequence when the telephone line is in use receiving data.

2. Discussion of the Background

Current line sharing devices have Calling Tone Signal (CNG) detection that allows the device to direct an incoming call to a facsimile machine. In addition, other detectors are capable of detecting coded Dual Tone Multi-Frequency (DTMF) operation or function signals as well as diverting and switching the incoming telephone call to a computer modem or other devices. In this way data can be received over a telephone line either by facsimile, computer modem, or other telephony devices.

The device that is most common for this type of switching is called a voice/data switch. The incoming telephone line is connected to the voice/data switch and a number of selected accessories such as a telephone set, answering machine, facsimile machine, computer modem, etc. are connected to assigned ports provided on the device. A microprocessor is utilized in the switch circuitry to provide automatic switching of the incoming telephone line to the proper port by the use of the incoming operation or function identification signals. These signals include the CNG signal as well as the coded DTMF signals that have been established as standards for the initialization of the various accessory equipment. At the present time, the CNG signal associated with facsimile machines is a 1100 Hertz tone. Various other tones have been established in connection with telephone systems for performing various functions and operations, such as a 440 Hertz tone for the call waiting function.

As stated above, the voice/data switch normally is automatic but it also can be used manually by pre-programming through a telephone key pad various DTMF tone codes which direct the device to perform certain operations and to make the required switch to the various desired ports.

One of the major problems that has been encountered in the past has been the inability to use the incoming telephone line while connected to a data receiving device, such as a computer modem. During the time that the telephone line is directly connected to the computer modem the line is "off-hook" and occupied and therefore "busy" to any other type of utilization. However, the telephone system providers have incorporated a service in this system which allows an incoming call waiting (CW) signal to be superimposed or inserted on the busy or occupied telephone line. Also, an additional service has been added which allows the caller ID (CID) signal to be sent after the call waiting signal to identify the new or second caller. In this way, the user of the "busy" telephone line is informed as to the identity of the caller and thus can make a decision as to whether to interrupt the present operation or to continue the present operation and ignore the incoming call.

One of the major deficiencies which has been uncovered through operations of this type is when the line is "busy" transmitting and receiving data the call waiting (CW) signal is not recognized and no "hook flash" is performed to make a telephone switch connection to a second caller. In addition, there has been no provision in the past for the detection of any coded function signals for a data transmission call during the call waiting sequence which could in turn automatically switch the device to a data outlet port to which a designated telephone accessory such as a fax machine is connected. The present invention is directed to this deficiency and provides a method and an apparatus for selectively detecting these signals and making the necessary new switch connections as a response.

In the past, it has been known to provide a CNG or DTMF signal detector which continuously monitors the telephone line but of course this is subject to numerous false detections due to the presence of analog and digital signals on the telephone line while it is in use. Further, as described above, when a computer modem is connected and using the telephone line, the user has no way of identifying that a call waiting tone signal has been received. Some home offices and businesses have separate dedicated telephone lines for the facsimile machine and the computer modem which eliminates this problem but this is a very expensive alternative. The present invention allows a sequenced detection of a CNG signal on a second incoming call that has been triggered by the call waiting signal while a computer modem or other data receiving device is in use.

INFORMATION DISCLOSURE STATEMENT

The following information is provided to comply with the inventors acknowledged duty to reveal any and all prior art of which they are aware that would in any way reflect on the determination by the examiner as to the patentability of the present invention.

The Telibasa patent (U.S. Pat. No. 5,146,489) discloses a device for controlling the flow of data between a single telephone line and either a facsimile machine or a telephone hand set. The device comprises means for detecting an incoming call as well as means for immediately activating the telephone in response to the detection of the incoming call thereby allowing the called party to answer the telephone before the incoming call is switched to a facsimile machine. CNG detection then allows the fax machine to be switched to the incoming line to receive the "hand shake" signals. A "ring" signal generator is provided for initiating the fax machine for functionally connecting the machine with the incoming telephone line.

The Lorenz et al patent (U.S. Pat. No. 5,151,972) discloses a system which includes a detector for monitoring a telephone line and upon detection of a ring signal the system automatically monitors the telephone line for either a CNG signal or a DTMF signal. Upon receipt of either one of these signals, the incoming call is automatically routed to one of a number of connected terminal devices. There is no reference or indication in this patent of the incorporation of a CNG detector in conjunction with a call waiting or caller ID signal.

The Sasso patent (U.S. Pat. No. 5,490,210) discloses a programmable telephone interface device which includes a microprocessor which allows incoming telephone calls to be automatically routed to various ports connected to a telephone and digital data devices. The incoming ring signal is detected through a detection circuit where the incoming telephone line is placed "off hook" and the line is then connected to a CNG and a dual tone multi-frequency (DTMF) detector to determine if these signals are present on the line. If they are, the signals are filtered and converted to digital signals which are interpreted by the microprocessor. The microprocessor then in turn selects the proper port corresponding to the type of signal received with a simulated ring signal then generated and connected to the active port. This patent does not disclose call waiting and/or caller ID signals indicating the presence of a second call on the existing telephone line. There is no reference that a CNG or DTMF sensor circuit is provided for receiving and interpreting any of the signals as a result of activation of the call waiting function.

The Nachman patent (U.S. Pat. No. 5,530,558) includes an apparatus for interfacing a conventional facsimile machine with a personal computer so that the facsimile machine can be used as a scanner or printer. Various switch assemblies are provided for selectively coupling the PC modem and facsimile machine either to an independent telephone line or between the two machines in a scan/printer mode. A manually operated switch is used for the switching function between the two features. When connected to the facsimile machine, the personal computer converts DC power from a battery source to generate a ring signal for initiating the facsimile machine. The scanned data is then transmitted in a conventional facsimile machine format or is connected to the PC for either facsimile services or with suitable software for converting a non-graphic material into a digital format suited for use in word processing applications. The switching modes can be provided automatically by a microprocessor through the reception of suitable coded signals.

SUMMARY OF THE INVENTION

The present invention can be provided as a stand alone device or can be incorporated into other telephonic circuits and devices to perform the disclosed novel function. Most telephone devices today incorporate a method of receiving a call waiting (CW) signal which is interpreted by the device as a second incoming telephone call on the telephone line when it is already "off-hook" and in use. Normally, the CW signal is a distinctive tone or series of tones which are audible to the user during a normal conversation. However, this notification is not available to the user when the telephone line is presently in use by connection to a data receiving and transmitting device such as a computer modem and a functioning computer. Thus, data is normally transmitted and received continuously over the telephone line without any possibility of interruption when the computer is connected to the Internet and surfing the global network for information.

In the present invention, a CW detector circuit is connected to the incoming telephone line while the line is also connected to the computer modem which allows the detector circuit to listen and detect a call waiting signal indicating that a second call is incoming on the existing line. The call waiting signal is a series of 440 hertz characteristic tone signals which are identified by the detector with an output signal directed to the microprocessor for performing unique routing functions which are the desired result of the present invention.

If a call waiting signal is received on the occupied telephone line the device automatically generates a "hook flash" signal which is introduced into the telephone line to activate the telephone company central office equipment that automatically switches the new call to the telephone line. Upon connection of the new second call to the telephone line, the device then listens for a 1100 hertz CNG tone signal, or a coded DTMF signal indicating that a data transmission operation is incoming with the second call. If these signals are received the microprocessor automatically connects the second call to the appropriate port to which the facsimile machine or other data device is connected. The computer modem which was originally connected to the telephone line will then be disconnected and will time out after a predetermined time period depending upon the Internet Service Provider (ISP) and the modem characteristics and connection to the computer.

If a CNG or coded DTMF signal is not received within a predetermined waiting period, a telephone can be activated or the device will automatically provide a second "hook flash" and will in turn reconnect the telephone line through the telephone company switching device to restore the first call. If the waiting period has not exceeded the allowed time period for the computer modem, the connection is restored and the computer is again connected to the telephone line and the prior existing service or the Internet provider.

The CNG and DTMF sensing circuit according to the present invention can be a stand-alone device or built into an existing voice/data switch apparatus or any other telephone apparatus. Many of the routing functions as required in the present invention can be performed by the switching functions available in a voice/data switch.

In addition to the other functions which have been described, the device, according to the present invention can also include a voice message function requesting the first caller to "please hold" before performing the "hook flash" to switch the telephone line to the second call. In addition, special information tones can also be sent over the telephone line when connecting to the second call to defeat telemarketers which is becoming a common necessity. The "call waiting" sensing or detector circuit provided in the present invention can also include a required verification of two or more call waiting tones before deciding that there is an actual waiting call and the "hook flash" function is triggered. This will eliminate many false switching operations. Although it is anticipated that the call waiting detection sensor can be on the line continuously, it is also possible to provide programmable detection windows for receiving these tones which would eliminate interference during existing use of the line. In addition, various modes can be incorporated into the device to accommodate operations with respect to "call waiting" or "call waiting/caller ID signals". Some or all of these additional enhancements can be incorporated into the circuitry and the methods of the present invention.

Other objects and benefits of this invention can be ascertained through the explanation that is provided and the drawings which accompany this application.

DETAILED DESCRIPTION OF THE INVENTION AND PREFERRED EMBODIMENTS

Figure 1:
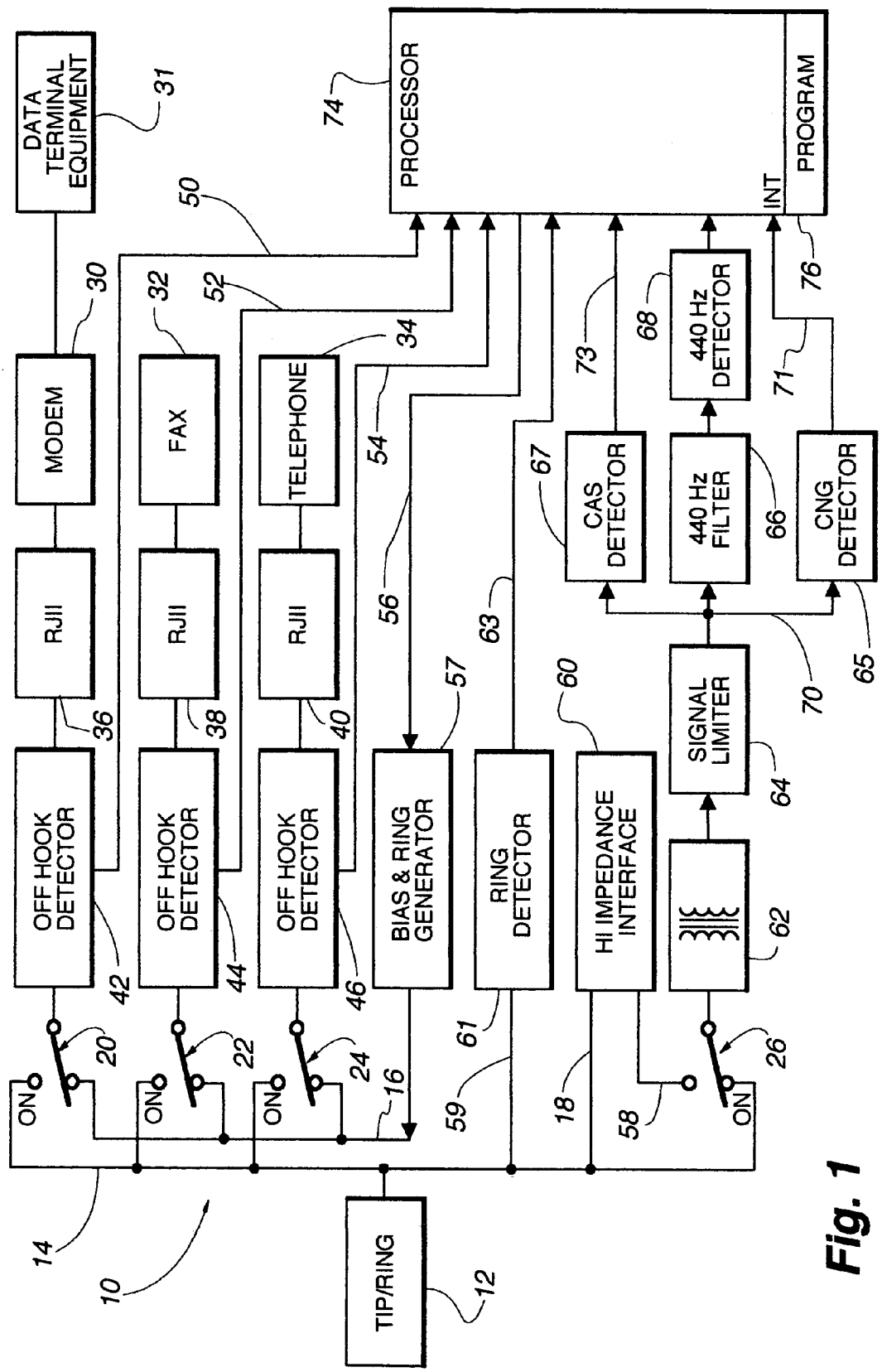
FIG. 1 is a block diagram of the components used in detecting CNG with call waiting in accordance with the present invention.

Turning more specifically to the drawings, FIG. 1 shows a block diagram 10 which is composed of the various elements making up the CNG signal detection and switching function which is the subject of the present invention. Some of the components which are shown are common to voice/data switches which are well known in the prior art and which are used to switch various auxiliary components as required when connected to a single telephone subscriber line.

In the present invention, the incoming telephone subscriber line 12 is connected to a bus 14 which is connected to a plurality of double pole, single throw relays 20, 22, 24 and 26. The pole which is connected to the incoming telephone line bus 14 is designated as the "on" connection to the relay. Thus, throughout this description whenever a reference is made to the "on" position for a relay it is intended that the relay is connected to the telephone line bus 14. This also designates that the selected component which is attached to the relay is also connected directly to the telephone line.

Three of the relays 20, 22 and 24 are connected to "off hook" detector circuits 42, 44, 46 which in turn are respectively connected to outlet ports 36, 38, 40 which are identified in FIG. 1 as RJ11 receptacle connectors. The outlet ports can be connected to a computer modem 30, facsimile machine 32, and telephone set and/or answering machine 34, respectively. The computer modem 30 in turn is connected to data terminal equipment 31 which can be a personal computer or PC. The port can alternatively be connected to a portable Internet terminal, teletype machine, IT device, etc. In most cases the modem 30 will be connected to a standard type personal computer which in most cases will be receiving data and information from a global information network such as the Internet. It is anticipated that the facsimile machine 32 will be a standard facsimile machine which is well known in the art. The telephone set or handset 34 can be an individual telephone or connected to a telephone network composed of various telephone extensions including a telephone answering machine.

During normal operation of the overall device, anyone of the three designated connected devices when placed "off hook" will automatically be detected by the "off hook" detectors 42, 44 or 46 which are connected through lines 50, 52, 54, respectively, to send an "off hook" signal to the microprocessor or processor 74 for activation of the appropriate relay 20, 22, 24. Thus, if the modem 30 is put into operation through a personal computer 31 the connection through the RJ11 port 36 triggers the "off hook" detector 42 which outputs a signal on line 50 to the processor 74. The processor 74 in turn triggers the associated relay 20 to the "on" position which in turn directly connects the modem to the bus 14 and the incoming telephone line 12. It is understood throughout this application that reference to the incoming telephone subscriber line 12 is referencing the "tip" and "ring" paired wire circuitry which is conventional in telephony services. Thus, as shown for illustration purposes in FIG. 1, where a line such as the telephone bus 14 is shown as a single line it actually represents a pair of wires which are the "tip" and "ring" conductors of the conventional telephone loop circuit.

When the respective component which is connected to the telephone line is no longer in use, the component is placed "on hook" which in turn sends a signal to the processor for deactivating the respective relay. Thus, anyone of the auxiliary telephony devices which are connected to the outlet ports can perform their normal function when used in conjunction with the typical voice/data switch.

In the present invention, a signal detector relay 26 is provided for detecting various function signals which may be superimposed upon the incoming telephone line 12. These signals can include call waiting (CW) along with caller identification (CID). In the same way a facsimile calling signal (CNG) can also be detected on the telephone subscriber line 12 when an incoming telephone call is indicated. When relay 26 is in the "on" position the incoming telephone line 12 and telephone bus 14 is connected through isolation transformer 62 to signal limiter 64. The signal limiter 64 is a conventional low pass filter and zero crossing detector that converts the low frequency of the incoming analog signal to a digital signal. The incoming telephone line 12, when connected to the modem 30, is continuously transmitting and receiving analog signals. This creates a considerable amount of extraneous noise on the line which can interfere with the recognition and receipt of simultaneous incoming telephone function signals.

As is well known in the art, the incoming call waiting signal is a series of short 440 hertz tone signals which identifies the call waiting (CW) function generated by the telephone company central office equipment. In the same way a calling facsimile machine generates and transmits a CNG signal which is a series of 1100 hertz tone signals which are indicative of the facsimile calling function.

In the present system, signals are detected in the processor 74 from the digital signal 70 produced by the signal limiter 64. The processor determines the frequency of the incoming signal and generates pre-determined responses based upon the frequency of the incoming signal. When the incoming signal is determined to be CNG, the processor 74 will start the process of connecting and initializing the port 38 for the facsimile machine 32. It is also understood, the frequency detection in the processor could be made all inclusive so that is can detect and sense the presence of other connected functional signals on the telephone line to imitate other functions including the initialization of other connected devices such as the computer modem 30. By the same token, the signal limiter 64 is connected to the isolation transformer 62 and is further connected to a 440 Hertz filter 66 and a 440 Hertz detector 68 that detects an incoming call waiting signal. The output signal from the detector 68 is connected to the processor 74 for initiating the response to the call waiting signal. It is also understood that on telephone systems that have caller identification on call waiting, these systems can also send a customer premise alert signal (CAS) immediately after the call waiting signal. Detection of the dual tone CAS can also be used as the indication of a call waiting signal. A separate CAS detector 67 can be connected by lines 73, 75 to the processor 74.

A high impedance interface 60 is connected by line 18 and 58 between the incoming telephone line bus 14 and relay 26. Thus, when the relay 26 is in the "off" position the isolation transformer 62 and the signal detecting circuits 64, 66, 68 are connected to the incoming telephone line 12 through line 58, high impedance interface 60 and line 18. In this case, the high impedance interface which is a conventional differential amplifier circuit provides a connection to the incoming telephone line which has the appearance of an open circuit such as an "on hook" condition. Thus, the detector circuit connected through the high impedance interface 60 can still passively listen for the incoming function signals without loading the telephone line and reducing the incoming DC voltage on the line.

In the "idle" state, signal detector relay 26 is normally placed in the "off" position. A ring signal detector 61 is connected to the telephone line bus 14 by line 59 and the output from the detector 61 is fed directly to the processor 74. Thus, the ring signal detector 61 continuously monitors the line 12 for an incoming telephone ring signal indicating that an incoming call is present. In a preferred embodiment, upon receiving the ring signal the processor turns relay 26 on and continues monitoring for additional function code signals and then activates the ring generator 57 through line 56. The ring generator 57 also provides a DC voltage on the relay bus 16. The ring generator 57 produces a 20 Hertz AC voltage which is typically within a 70 to 90 volt range. Upon the processor 74 receiving an incoming ring signal the appropriate relay is energized and the internal ring generator 57 is initiated to send the appropriate ring signal to the selected accessory. When the accessory is initiated and it goes to an "off hook" condition the DC voltage on the line keeps the accessory active and the processor then recycles the appropriate relay to place that relay in the "on" position where the accessory is connected directly to the telephone bus 14 and incoming telephone subscriber line 12. Upon completion of the call and the accessory goes to an "on hook" condition the appropriate relay is triggered by the processor to the "off" position and a return to the "idle" state for the circuit.

Figure 2A:
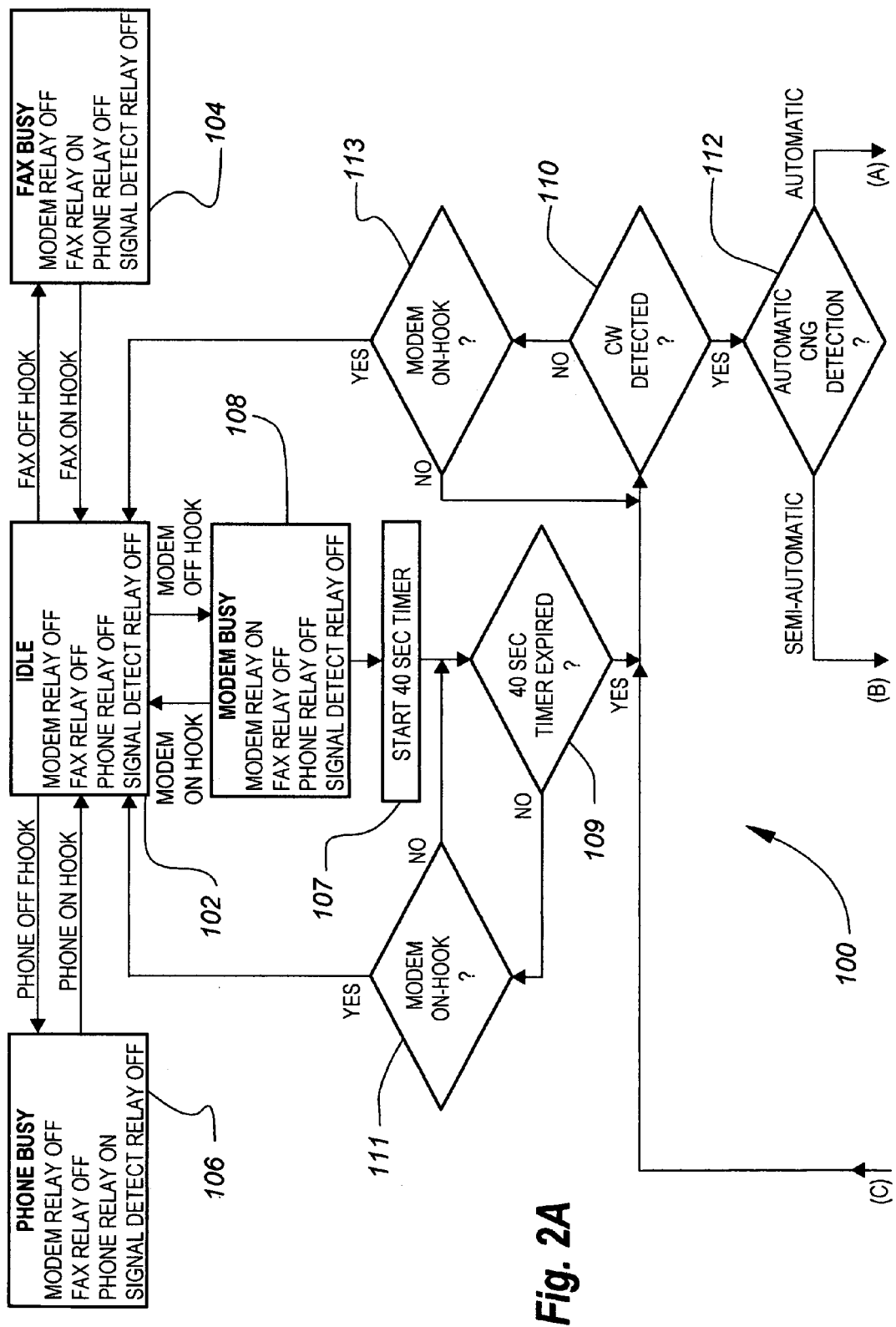
FIGS. 2A, 2B and 2C is a flow diagram showing the steps preformed in detecting a CNG signal during a call waiting function.
Figure 2B:
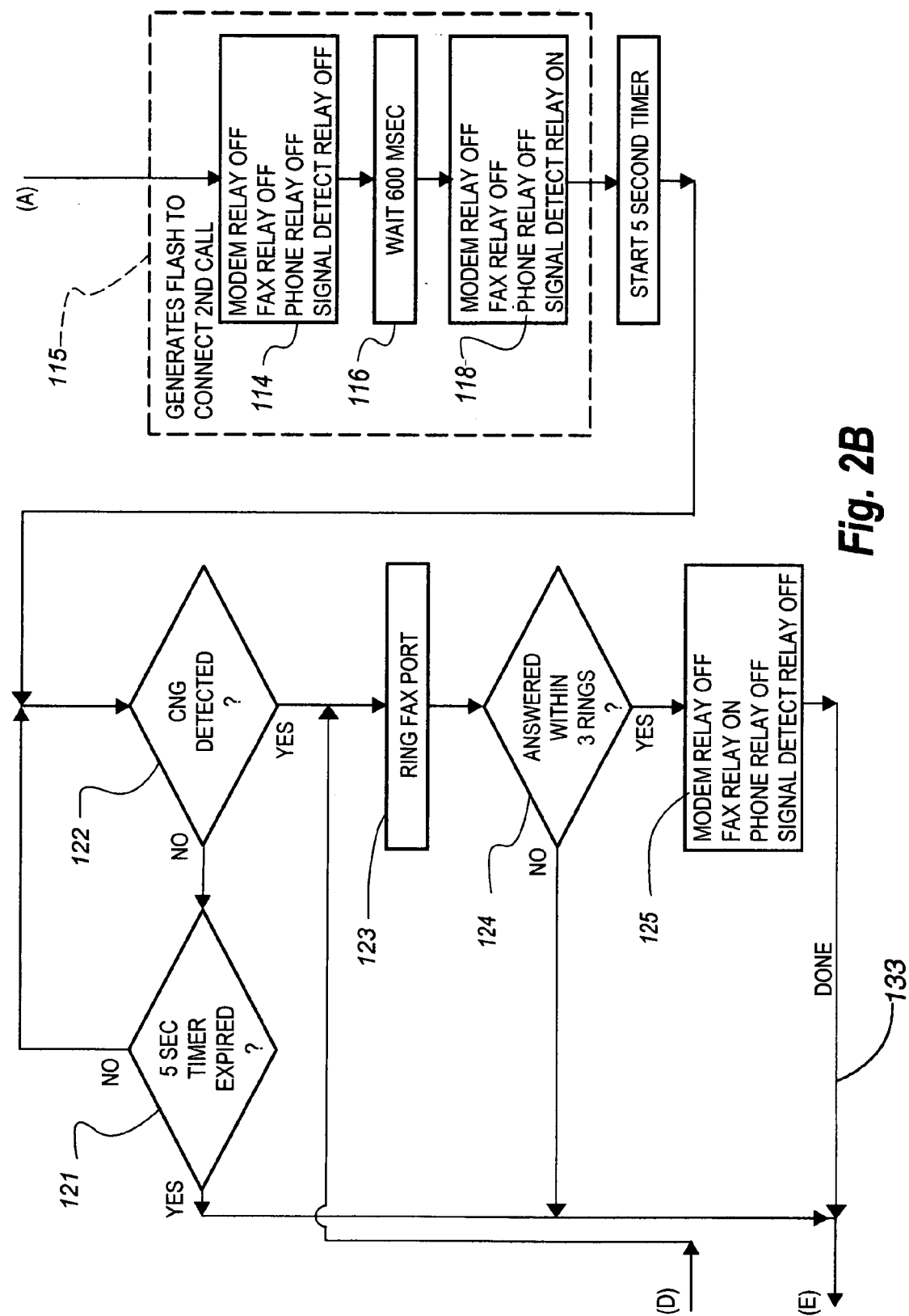
Figure 2C:
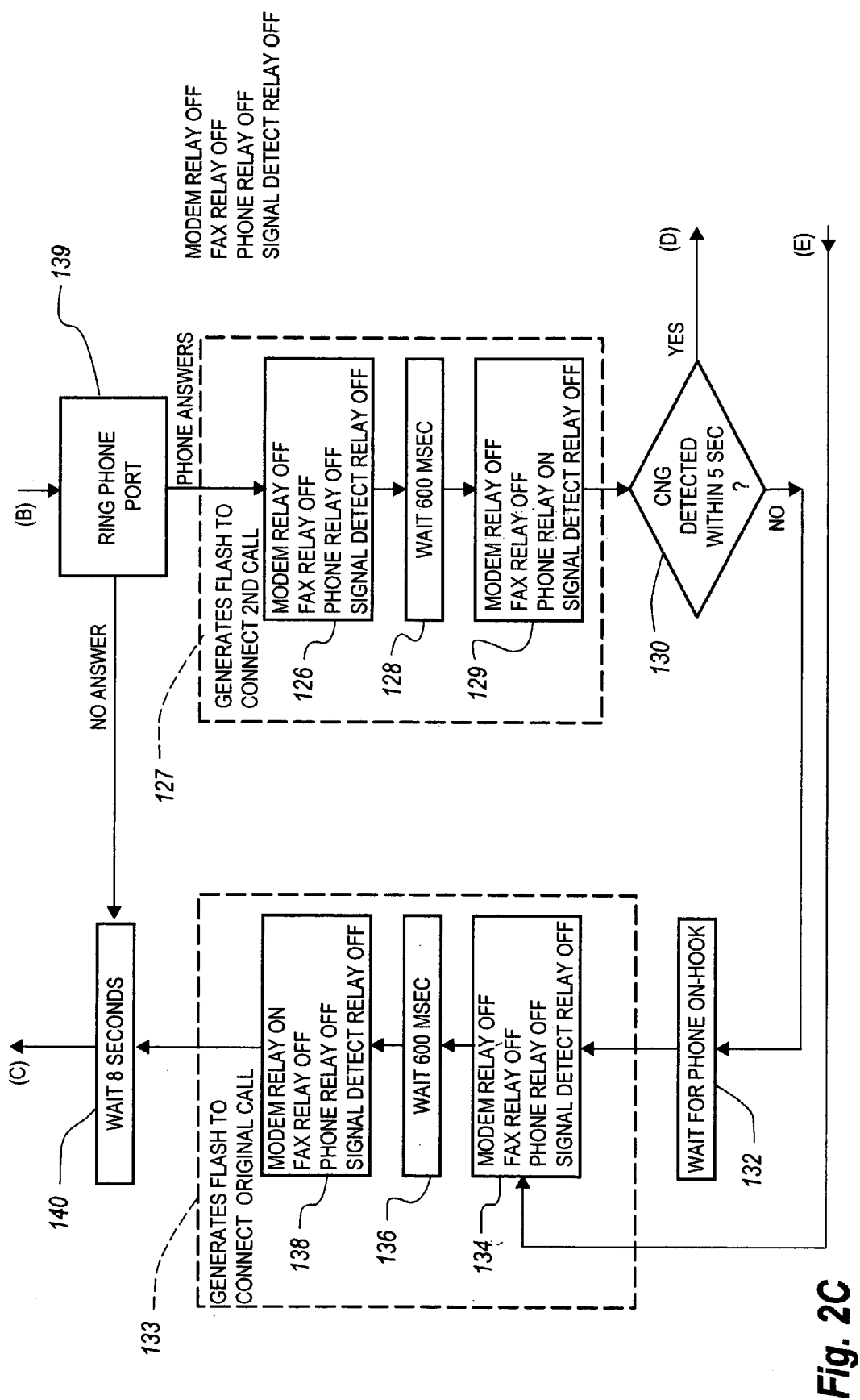

FIGS. 2A, 2B and 2C represents a flow diagram which describes the functionality of the CNG detection operation provided in the present invention. It is understood that the circuitry as provided herein can be provided as a stand alone device or it can be incorporated into the components and software present in a voice/data device or built into various telephone sets or other telephone accessories. An accessory of this type can be a computer modem, a facsimile machine, RTTY receiver or the like.

As shown in the present logic diagram, the circuit is initially placed in the "idle" state 102 in which the modem, fax and phone relays are all in the "off" position. In addition, the signal detector relay is also in the "off" position. If the telephone handset is taken "off hook" 106 the modem, fax and signal detector relays remain in the "off" position while the phone relay is automatically switched to the "on" position. As previously described the phone "off hook" detector 46 sends a signal to the processor 74 which triggers the phone relay 24 to the "on" position directly connecting the telephone set to the incoming line 12. Once the telephone set is placed in an "on hook" position, this sequence of events is reversed and the circuit is returned to the "idle" state 102.

By the same token, if the facsimile machine is initiated to an "off hook" condition 104 the modem, phone and the signal detector relays remain in an "off hook" position while the fax relay is switched to an "on" position. Again, as previously described this initiates the "off hook" detector 44 which sends a signal to the processor 74 which switches the fax relay 22 to the "on" position so as to directly connect the facsimile machine 32 to the incoming subscriber line 12. Upon the facsimile machine completing its call and returning to an "on hook" condition, the relay sequence is reversed and the circuitry returns to the "idle" state 102.

The operation with respect to the use of the connected computer modem 30 is different from the stand point that the telephone line 12 when connected to the computer modem 30 for an extended length of time leaves the telephone line 12 and its associated circuitry blind with respect to the detection and recognition of any incoming operational signals such as call waiting, caller ID or facsimile (CNG) signals. The present invention provides a unique solution to this dilemma by permitting these incoming operational signals to be received and activated when the telephone line is connected to a data device or the computer modem 30 and data transmission is taking place.

In this operation, the initiation of the computer modem 30 causes the modem relay to be switched to the "on" position while the fax, phone and signal detector relay remain in the "off" position 108. A forty second time delay 107 is initiated for the modem to either answer an incoming call or to dial out a preprogrammed telephone number for a data connection. In addition, this time is provided for the hand shake necessary between the connected machines so as to initiate the transmission of data. The forty second time delay has been found to be quite satisfactory for the purpose of connecting the computer modem. If the time expires and the modem has not yet connected, step 111 checks to see if the modem is "on hook" and if it is, the modem relay is switched to the "off" position and the circuitry returns to the "idle" state 102. If the modem is "off hook", then the modem is recycled back to see if a connection can still be made. On the other hand, if the modems connect and start the transmission of data, when the time delay expires 109 the circuitry immediately starts the process of listening for CW signals on the line while the modem is in step 110. If the data transmission is completed and no CW signal has been received the modem is checked 113 to determine if it is "on hook" and if it is the circuitry will return to the "idle" state 102. If it is not "on hook" it will cycle back to check if a CW signal has been detected.

However, if a CW signal is received while the computer modem is in operation then a logic sequence is required. Although it is possible to proceed with the receipt of a single CW signal, it is usually desirable to wait until two CW signals have been received in order to provide better reliability that a valid call waiting signal has been received.

At step 112, the process is bifurcated which is accomplished by programming of the software for the processor 74 whereby CNG detection will be accomplished either automatically or semi-automatically.

In the automatic mode and upon receipt of the call waiting signal, a "hook flash" is generated 115 by positioning all of the modem, fax, phone and signal detector relays in the "off" position 114. This places the incoming telephone subscriber line 12 in the "on hook" position for at least 600 msec 116 which creates a "hook flash" signal to the telephone central office (CO) which creates the call switching to place the first call on hold and connect the second call to the incoming telephone line 12. Once this switching process has taken place, the signal detector relay 26 is then immediately switched to the "on" position 118. The processor 74 continues to receive incoming CNG detector signals when present. In the mean time, while the relays 20, 22, 24, are in the "off" position a DC voltage is applied through the relay bus 16 to the "off hook" detectors for the individual accessory devices and thus the modem is allowed to continue functioning at this time which maintains the modem in an "active" state. The signal detector relay remains in the "on" position.

If a CNG signal is received, the processor energizes the ring generator 57 to initiate 123 the facsimile machine 32. If the facsimile machine answers 124 within three rings, the modem, phone and signal relays are switched to the "off" position and the fax relay is turned "on" 125 connecting the facsimile machine to the telephone line 12. If the facsimile machine does not answer within three rings or if the connected facsimile machine returns to an "on hook" condition, a signal 133 is generated and the line returns to the first call with a reconnection of the modem, if possible. If a reconnection is made then the circuit returns to step 110 and continues to listen for an incoming call waiting signal. If the modem does not reconnect and re-arm then the circuit returns back to the "idle" state 102.

A provision is made in the device which allows through preprogramming of the processor 74 a "semi-automatic" operation evolving from step 112 wherein the ring generator is initiated to place the ring signal on the relay bus 16 which in turn sends a ring signal to a connected telephone 34. This process is included in order to allow the system once a call waiting signal is detected to go directly to the telephone to determine if the incoming call is an audible call. If the telephone connected to the outlet port 40 is answered and goes to an "off" hook condition, a "hook flash" is generated 127 by placing all of the relays in the "off" position momentarily for at least a waiting period of 600 msec and then immediately turning the phone relay on to connect the telephone directly to the incoming telephone line 12. If the phone 40 is not answered within a predetermined number of ring signals then after an eight second wait 140 the system is returned to the state of waiting for a CW signal 110. At this point, the modem is still in the "on" state and should continue to be active with the first call.

With the telephone connected as a result of the "hook flash" generation 127 there is a continuation for a period of five seconds for detecting the incoming CNG signal from the second call. If the CNG signal is received at this time then the circuit is returned to step 123 where a ring signal is transmitted to the fax port to initiate the facsimile machine 32. If the facsimile machine answers within three rings then the fax relay is turned on and the phone relay is turned off. The call will then proceed as a data transmission call to the facsimile machine until completion. At the end of either one of these states the processor 74 generates a "hook flash" 133 by turning off all of the relays 134 waiting momentarily for at least 600 msec and then turning on the modem relay. Subsequently, after an eight second wait 140 the process is returned to the CW detection step 110 for its return through step 113 to the "idle" state 102 if the modem has not reconnected at this time.

The time delay of eight seconds 140 is a "re-arm" time period which is provided as an eight second delay to allow the modem sufficient time to reconnect to the first caller. In this way, the present system allows the modem to be in operation and yet allow the reception of CW signals if and when they are present on the line. Upon receipt of a CW signal a "hook flash" is generated by repositioning the existing relays and monitoring for CNG signals indicating that an incoming fax or data transmission is also present. It is this combination of CW signals and its responsive line switching operation along with the listening for CNG signals from the second call which forms the basis for the present invention. This highly desirable function has been overlooked by the industry and therefore can not be considered obvious in view of the prior art that is available. It is also the intent of the present invention to utilize the characteristics and functional abilities of modems and Internet service providers to bridge the time delay that inherently exists when disconnecting a connected modem from the first call data transmission to a second call when a CW signal is detected. The present invention is intended to operate within a matter of seconds to determine if a CNG signal is included with the second call so that the facsimile machine can be immediately activated or a telephone response is accomplished so that if neither function exists the line can be quickly reconnected to the first call and the modem reconnected with a high probability of being able to make the return connection. In this way, the original data transmission can continue uninterrupted if these conditions are not met.

The present invention is also directed to the resolution of a problem which exists with the operation of voice/data switches and the use of the switches with a call waiting feature while a connected computer is in operation. The resolution to this problem allows the sequencing of events to be preformed automatically or semi-automatically in order to obtain a new and unobvious result and allow the automatic reception of a facsimile or a data transmission while the user is originally connected to and surfing the Internet.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A method for detecting a functional code signal on a telephone line which has been switched by a call waiting signal from a first data transmission call to a second data transmission call and connecting the appropriate data device to receive the data transmission, the method comprising the steps of:
   (a) sensing a call waiting signal on a telephone line while receiving a data transmission;
   (b) generating a "hook flash" signal on the telephone line so as to cause the line to be disconnected from a first data transmission call and connect a second incoming data transmission call;
   (c) monitoring the telephone line for a coded data functional signal associated with the incoming second data transmission call; and
   (d) upon sensing said coded data functional signal, activating an appropriate data receiving device and connecting said device to the line to receive said second data transmission call.

2. The method as described in claim 1 which further includes the step of:
   (a) if a coded data functional signal is not received, generate a ring signal to activate a telephone for the reception of a voice transmission call and then connect the telephone to the telephone line when said telephone goes to an "off-hook" condition.

3. The method as described in claim 1 which further includes the step of:
   (a) generating a second "hook flash", if the second data transmission call is not connected or when the second data transmission call is completed so that the second call is disconnected from the telephone line and the first call is reconnected whereby the first data transmission call can be restored.

4. A method for detecting call waiting and facsimile CNG signals on a busy telephone line while connected to a functioning computer modem so that if the signals are received the line will be switched to a second call and a connected facsimile machine whereby a data transmission can be received, the method comprising the steps of:
   (a) monitoring a busy telephone line for a call waiting signal;
   (b) upon detecting a call waiting signal on said line, generating a first "hook flash" on the telephone line to cause the line to be switched to a second call;
   (c) monitoring the second call on the telephone line for a facsimile CNG signal; and
   (d) upon detecting a CNG signal on said telephone line, applying a bias voltage on the computer modem to maintain it in an active state, generating a plurality of ring signals to activate a facsimile machine to receive said data transmission, connecting the facsimile machine to the telephone line when the facsimile machine answers in response to said ring signal, and generating a second "hook flash" upon the completion of the data transmission to switch the telephone line to the first call and attempt to reconnect the active computer modem.

5. The method as described in claim 4 wherein, if a facsimile CNG is not received within a predetermined time period, the second "hook flash" is generated to switch the telephone line to the first call and reconnect the active computer modem.

6. The method as described in claim 4 which further includes the step of waiting for at least two call waiting signals to be received before generating said "hook flash" to verify that a valid call waiting signal is received before switching to the second call.

7. The method as described in claim 4 which further includes waiting a predetermined time period after the "hook flash" is generated for the telephone line switch to take place before monitoring the second call for the facsimile CNG signal.

8. A telephony device for detecting CNG function signals on a busy telephone line after a call waiting sequence and switching the line to a connected facsimile machine, the device comprising:
   (a) a routing device having at least one telephone line input and one or more outlet ports connected to telephony devices including a facsimile machine; and
   (b) said routing device includes:
      (1) a call waiting detector for receiving an incoming call waiting signal on the telephone line while busy with a first call, and switching means for generating a "hook flash" so as to activate a call waiting sequence and switch the telephone line to a second call when a call waiting signal is detected; and
      (2) a facsimile CNG signal detector for monitoring said telephone line when the second call is connected and triggering said switching means to connect the facsimile machine to the telephone line when a CNG signal is received.

9. A telephony device as defined in claim 8 wherein the routing device includes a microprocessor for receiving the CNG signal and controlling the switching means, and said switching means includes a plurality of relays, one of said relays is connected to each of the outlet ports for controlling the attached telephony device.

10. A telephony device as defined in claim 9 wherein the call waiting detector and facsimile CNG signal detector produce output signals which are sent to said microprocessor whereby the processor activates the appropriate relay for controlling the facsimile machine.

11. A telephony device as defined in claim 9 wherein the call waiting signal detector is connected to the telephone line through a high impedance interface so that the call waiting detector can passively monitor the telephone line.

12. A telephony device as defined in claim 8 wherein the triggering of said switching means is delayed a predetermined time period to allow the facsimile machine to be activated before it is connected to the telephone line when a CNG signal is received.

* * * * *